(12) United States Patent
Nodera et al.

(10) Patent No.: US 6,995,211 B2
(45) Date of Patent: Feb. 7, 2006

(54) FLAME-RETARDANT POLYCARBONATE RESIN COMPOSITION AND MOLDED ARTICLE THEREOF

(75) Inventors: Akio Nodera, Chiba (JP); Masahiro Kitayama, Chiba (JP); Toshio Isozaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 96 days.

(21) Appl. No.: 10/466,312

(22) PCT Filed: Jan. 11, 2002

(86) PCT No.: PCT/JP02/00138

§ 371 (c)(1),
(2), (4) Date: Jul. 25, 2003

(87) PCT Pub. No.: WO02/059206

PCT Pub. Date: Aug. 1, 2002

(65) Prior Publication Data

US 2004/0054045 A1    Mar. 18, 2004

(30) Foreign Application Priority Data

Jan. 25, 2001    (JP) .......................... 2001-016693

(51) Int. Cl.
*C08L 83/04*    (2006.01)
(52) U.S. Cl. ..................................... 525/101
(58) Field of Classification Search ............. 525/101
See application file for complete search history.

(56) References Cited

U.S. PATENT DOCUMENTS

| | | | |
|---|---|---|---|
| 3,971,756 A | | 7/1976 | Bialous et al. |
| 4,110,299 A | * | 8/1978 | Mark .......................... 524/84 |
| 4,263,201 A | | 4/1981 | Mark et al. |
| 5,605,962 A | * | 2/1997 | Suzuki et al. ................ 525/70 |
| 5,621,029 A | | 4/1997 | Eckel et al. |
| 6,127,465 A | | 10/2000 | Nodera |
| 6,150,443 A | | 11/2000 | Nodera et al. |
| 6,197,857 B1 | | 3/2001 | Nodera et al. |
| 6,331,584 B1 | | 12/2001 | Nodera et al. |
| 6,348,527 B1 | | 2/2002 | Nodera |
| 6,384,114 B1 | | 5/2002 | Nodera |
| 6,448,324 B1 | | 9/2002 | Nodera et al. |
| 6,454,969 B1 | * | 9/2002 | Nishihara ................... 252/609 |
| 6,462,167 B1 | | 10/2002 | Nodera et al. |
| 6,465,555 B1 | | 10/2002 | Nodera et al. |
| 6,498,228 B1 | | 12/2002 | Nodera et al. |
| 6,576,706 B1 | | 6/2003 | Nodera et al. |

FOREIGN PATENT DOCUMENTS

| | | | |
|---|---|---|---|
| EP | 0 522 751 | | 1/1993 |
| EP | 1 142 956 | | 10/2001 |
| JP | 11-172063 | * | 6/1999 |
| JP | 11 172063 | | 6/1999 |

* cited by examiner

*Primary Examiner*—Peter Szekely
(74) *Attorney, Agent, or Firm*—Oblon, Spivak, McClelland, Maier & Neustadt, P.C.

(57) ABSTRACT

A flame-retardant polycarbonate resin composition which exhibits excellent flame-retarding property and retention of the antistatic property for a long time. It comprises (A) a polycarbonate resin, (B) an aromatic vinyl resin having an acid salt group and (C) a silicone compound having a reactive group.

9 Claims, No Drawings

FLAME-RETARDANT POLYCARBONATE RESIN COMPOSITION AND MOLDED ARTICLE THEREOF

TECHNICAL FIELD

The present invention relates to a flame-retardant polycarbonate resin composition and a molded product thereof More particularly, the present invention relates to a flame-retardant polycarbonate resin composition exhibiting an excellent flame-retarding property and retention of the antistatic property for a long time.

BACKGROUND ART

Polycarbonate resins are widely used in the various fields such as the electric or electronic apparatus fields for office automation apparatuses, information and communication apparatuses and household electric apparatuses and the like, the automobile field, the lighting apparatus field and the building field due to the excellent impact resistance, heat resistance and dimensional stability. Although the polycarbonate resin has the self-extinguishing property by itself, it is desired that the flame-retarding property is enhanced to further improve the safety when the resin is used as a raw material for electric and electronic apparatuses such as office automation apparatuses, members of automobiles and members of lighting apparatuses.

As the method for improving the flame-retarding property of the polycarbonate resin, halogen-based flame retardants such as halogenated bisphenol A and halogenated polycarbonate oligomers have been used in combination with an auxiliary flame retardant such as antimony oxide due to the excellent efficiency of flame retardation. However, in recent years, a method for flame retardation using a flame retardant containing no halogens is required from the standpoint of the safety and the great effect of the flame retardants containing a halogen on the environment during incineration. Since the excellent flame-retarding property and the effect as a plasticizer are exhibited simultaneously when an organic phosphorus-based flame retardant, in particular, an organic phosphoric acid ester compound, is used as the flame retardant containing no halogens, flame-retardant polycarbonate resin compositions using the organic phosphoric acid ester compound are proposed.

However, it is necessary that the organic phosphoric acid ester compound be used in a relatively great amount for flame retardation of a polycarbonate resin with the organic phosphoric acid ester compound. To produce a thinner molded article having a great size, it is necessary that the molding temperature be elevated since the polycarbonate resin requires a high temperature for molding and has a great melt viscosity. Therefore, the organic phosphoric acid ester compound is not always satisfactory from the standpoint of the environment of molding and the appearance of the product due to drawbacks such as attachment of the compound to a mold and generation of gases during the working although the compound contributes to exhibiting the flame-retarding property. The molded product obtained from the flame-retardant polycarbonate resin composition using the organic phosphoric acid ester compound has a drawback in that a decrease in impact strength and discoloration take place after exposure to a high temperature or to a high temperature and a high humidity.

In Japanese Patent Application Laid-Open No. Showa 50(1975)-98546, to overcome the above problems, it is proposed that a polycarbonate resin is made flame retardant by using a small amount of a metal salt of a polymeric aromatic sulfonic acid such as the sodium salt of a polystyrenesulfonic acid. However, when polystyrene is sulfonated in accordance with a conventional process and neutralized with sodium hydroxide and a polycarbonate is made flame retardant with the obtained sodium polystyrenesulfonate, a drawback arises in that the appearance of the product becomes poor due to poor dispersion of sodium polystyrenesulfonate although the excellent flame-retarding property can be obtained.

For a flame-retardant polycarbonate resin composition, it is also required that a material for molding which is made flame retardant while the excellent physical properties proper to the polycarbonate resin is retained be developed. To satisfy the requirement, for example, a flame-retardant polycarbonate resin composition obtained by adding an organic alkali metal salt or an organic alkaline earth metal salt and an organopolysiloxane to a polycarbonate resin is proposed in Japanese Patent Application Laid-Open No. Heisei 8(1996)-176425. However, this composition has a drawback in that dusts are easily attached to the surface of the product obtained by molding the flame-retardant polycarbonate resin composition.

As described above, the development of a flame-retardant polycarbonate resin composition which provides an article exhibiting excellent flame-retarding property and retention of the antistatic property to prevent the attachment of dusts, has been desired.

The present invention has an object of providing a flame-retardant polycarbonate resin composition which provides an article exhibiting excellent flame-retarding property and retention of the antistatic property to prevent the attachment of dusts and a molded article thereof.

DISCLOSURE OF THE INVENTION

As the result of extensive studies by the present inventors to overcome the above problems, it was found that the above object could be achieved with a flame-retardant polycarbonate resin composition comprising a polycarbonate resin, an aromatic vinyl resin having an acid salt group and a silicone compound having a reactive group in specific relative amounts. The present invention has been completed based on this knowledge.

The present invention can be summarized as:

[1] A flame-retardant polycarbonate resin composition which comprises 90 to 99.9% by mass of a polycarbonate resin as component (A), 0.05 to 5% by mass of an aromatic vinyl resin having an acid salt group as component (B) and 0.05 to 5% by mass of a silicone compound having a reactive group as component (C);

[2] A flame-retardant polycarbonate resin composition as described in [1], wherein the polycarbonate resin of component (A) is a polycarbonate copolymer resin having a structural unit derived from an organosiloxane;

[3] A flame-retardant polycarbonate resin composition as described in any one of [1] and [2], wherein the aromatic vinyl resin having an acid salt group of component (B) is a metal salt of a polystyrenesulfonic acid;

[4] A flame-retardant polycarbonate resin composition as described in any one of [1] to [3], wherein the silicone compound having a reactive group of component (C) is a silicone compound having a reactive group and phenyl group;

[5] A flame-retardant polycarbonate resin composition as described in any one of [1] to [4], wherein the silicone compound having a reactive group of component (C) is a silicone compound having at least one reactive group selected from a group consisting of alkoxyl group, hydroxyl group, epoxy group and vinyl group;

[6] A flame-retardant polycarbonate resin composition as described in any one of [1] to [5], which further comprises at least one stabilizer selected from a group consisting of antioxidants and ultraviolet light absorbents as component (D);

[7] A molded article prepared by molding a flame-retardant polycarbonate resin composition described in any one of [1] to [6];

[8] A molded article as described in [7], which is a member of an electric or electronic apparatus, a member of an automobile or a member of a lighting apparatus; and

[9] A molded article as described [7], which is a lens of a head lamp of an automobile.

THE MOST PREFERRED EMBODIMENT TO CARRY OUT THE INVENTION

The most preferred embodiment to carry out the invention will be described in the following.

The flame-retardant polycarbonate resin composition of the present invention comprises 90 to 99.9% by mass of a polycarbonate resin as component (A), 0.05 to 5% by mass of an aromatic vinyl resin having an acid salt group as component (B) and 0.05 to 5% by mass of a silicone compound having a reactive group as component (C). To the basic flame-retardant polycarbonate resin composition comprising components (A), (B) and (C) in specific relative amounts, at least one stabilizer selected from a group consisting of antioxidants and ultraviolet light absorbents as component (D) may be added, where necessary.

The polycarbonate resin of component (A), the aromatic vinyl resin having an acid salt group of component (B), the silicone compound having a reactive group of component (C) and the stabilizer of component (D) will be described in detail in the following.

(A) Polycarbonate Resin

The polycarbonate resin used as component (A) of the raw materials of the flame-retardant polycarbonate resin composition of the present invention is not particularly limited and polycarbonate resins having various structural units can be used. In general, aromatic polycarbonates produced by the reaction of dihydric phenols and carbonate precursors can be used. In other words, products obtained by the reaction of dihydric phenols and carbonate precursors in accordance with the solution process or the melt process can be used.

Examples of the dihydric phenol include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)-cyclohexane, bis(4-hydroxyphenyl) ether, bis(4-hydroxyphenyl) sulfide, bis(4-hydroxyphenyl) sulfone, bis (4-hydroxyphenyl) sulfoxide, bis(4-hydroxyphenyl) ketone, hydroquinone, resorcinol and catechol. Among these dihydric phenols, bis(hydroxyphenyl)alkanes are preferable and compounds obtained by using 2,2-bis(4-hydroxyphenyl)propane as the main material are more preferable.

Examples of the carbonate precursor include carbonyl halides, carbonyl esters and haloformates. Specific examples of the carbonate precursor include phosgene, dihaloformates of dihydric phenols, diphenyl carbonate, dimethyl carbonate and diethyl carbonate.

The molecular structure of the polymer chain of the polycarbonate resin may be linear or branched. Examples of the branching agent used for introducing the branched molecular structure include 1,1,1-tris(4-hydroxyphenyl) ethane, $\alpha,\alpha',\alpha''$-tris(4-hydroxyphenyl)-1,3,5-triisopropylbenzene, phloroglucinol, trimellitic acid and isatin bis(o-cresol). As the molecular weight modifier, phenol, p-t-butylphenol, p-t-octylphenol and p-cumylphenol can be used.

The polycarbonate resin used in the present invention may be a homopolymer produced by using the dihydric phenol described above alone, a copolymer having the structural unit of a polycarbonate and the structure unit of a polyorganosiloxane or a resin composition comprising the above homopolymer and the above copolymer. The polycarbonate resin may also be a polyester-polycarbonate resin obtained by polymerization of a polycarbonate in the presence of an ester precursor such as a dibasic carboxylic acid which is, for example, terephthalic acid and a derivative of the dibasic carboxylic acid forming an ester. A resin composition obtained by melt mixing polycarbonate resins having various structural units may be used. As the polycarbonate resin used as component (A) in the present invention, a polycarbonate resin substantially comprising no halogen atoms in the structural unit thereof is preferable.

It is preferable that the polycarbonate resin used as component (A) has a viscosity-average molecular weight in the range of 10,000 to 100,000. When the viscosity-average molecular weight is smaller than 10,000, the thermal and mechanical properties of the obtained resin composition are not sufficient. When the viscosity-average molecular weight exceeds 100,000, workability in molding the obtained resin composition becomes poor. It is more preferable that the viscosity-average molecular weight of the polycarbonate resin is in the range of 11,000 to 40,000 and most preferably in the range of 12,000 to 30,000.

(B) Aromatic Vinyl Resin Having an Acid Salt Group

As the aromatic vinyl resin having an acid salt group used as component (B) of the raw materials of the flame-retardant polycarbonate resin composition of the present invention, aromatic vinyl resins having a structure in which some of hydrogen atoms on the aromatic ring in the polymer chain of the aromatic vinyl resin are substituted with an acid salt group are preferable. As the aromatic vinyl resin, aromatic vinyl resins having at least a structural unit derived from styrene in the polymer chain such as polystyrene, polystyrene modified with rubber, styrene-acrylonitrile copolymers and acrylonitrile-butadiene-styrene copolymer resins can be used. Among these resins, polystyrene resins are preferable.

Examples of the acid salt group substituting the hydrogen atom on the aromatic ring in the aromatic vinyl resin include alkali metal salt groups, alkaline earth metal salt groups and ammonium salt groups of sulfonic acid, boric acid and phosphoric acid. The fraction of the hydrogen atoms substituted with the acid salt group among the entire hydrogen atoms is not particularly limited and can be suitably selected in the range of 10 to 100%.

As the polystyrene resin having an acid salt group which is preferable as the aromatic vinyl resin having an acid salt group, polystyrene resins having an acid salt group represented by the following general formula (1):

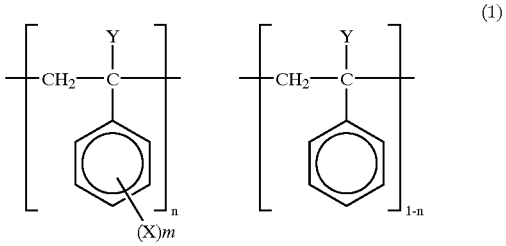

(1)

wherein X represents an acid salt group, Y represents hydrogen atom or a hydrocarbon group having 1 to 10 carbon atoms, m represents an integer of 1 to 5, n represents the mole fraction of the structural unit derived from styrene substituted with the acid salt group, and $0<n\leq1$; are preferable.

As the acid salt group represented by X in general formula (1), salt groups of sulfonic acid, boric acid and phosphoric acid are preferable and alkali metal salt groups such as sodium salts and potassium salts, alkaline earth metal salt groups such as the magnesium salts and calcium salts, aluminum salts, zinc salts, tin salts and ammonium salts of the above acids are more preferable. It is preferable that Y in general formula (1) represents hydrogen atom and that Y represents methyl group when Y represents a hydrocarbon group.

As for the process for producing the aromatic vinyl resin having an acid salt group of component (B), the resin can be produced in accordance with the process in which an aromatic vinyl monomer having sulfonic acid group or the like used as the monomer is homopolymerized or copolymerized with other copolymerizable monomers and the obtained product is neutralized with a basic substance. The above resin can be produced also in accordance with the process in which an aromatic vinyl polymer, an aromatic vinyl copolymer or a mixture of the polymer and the copolymer is sulfonated and the obtained product is neutralized with a basic substance. When the polymer, the copolymer or a mixture thereof is sulfonated and the resultant product is neutralized with a basic substance, for example, the aromatic vinyl resin can be obtained by adding anhydrous sulfuric acid to a solution of polystyrene resin in 1,2-dichloroethane to produce a polystyrenesulfonic acid by the reaction, neutralizing the obtained polystyrenesulfonic acid with a basic substance such as sodium hydroxide and potassium hydroxide, and purifying the resultant product.

It is preferable that the aromatic vinyl resin having an acid salt group of component (B) has a content of inorganic metal salts decreased to less than 5% by mass and preferably less than 3% by mass based on the amount of the aromatic vinyl resin having an acid salt group. When the product obtained by sulfonation of the aromatic vinyl resin such as polystyrene resin is neutralized with sodium hydroxide and is not subjected to any further treatments, sodium sulfate formed as a byproduct is left remaining in sodium polystyrene-sulfonate. When the content of sodium sulfate exceeds 5% by mass, the mechanical, thermal and electrical properties of the flame-retardant polycarbonate resin composition and the appearance of the molded article deteriorate. Sodium polystyrene-sulfonate can be purified by recrystallization using a solvent, separating sodium sulfate formed as a byproduct by filtration or by a treatment with an ion exchange resin, a chelating agent or an adsorbent.

It is preferable that the aromatic vinyl resin having an acid salt group of component (B) has a weight-average molecular weight in the range of 1,000 to 300,000. When the weight-average molecular weight of the aromatic vinyl resin having an acid salt group is smaller than 1,000, physical properties of the resin composition obtained by using this resin deteriorate. When the weight-average molecular weight of the aromatic vinyl resin having an acid salt group exceeds 300,000, fluidity of the resin composition obtained by using this resin as a component becomes poor and the productivity decreases.

(C) Silicone Compound Having a Reactive Group

As component (C) of the raw materials of the flame-retardant polycarbonate resin composition of the present invention, a silicone compound having a reactive group is used. When a flame-retardant polycarbonate resin composition comprises a silicone compound having no reactive group as component (C), the transparency which is the excellent property of the polycarbonate resin cannot be retained. As the silicone compound having a reactive group, a silicone compound having at least one reactive group selected from the group consisting of alkoxyl group, hydroxyl group, epoxy group and vinyl group is preferable.

It is preferable that the silicone compound has a refractive index in the range of 1.45 to 1.55. When a silicone compound having the refractive index in the above range and having the reactive group is used as component (C), the transparency of the flame-retardant polycarbonate resin composition is improved and the flame-retardant polycarbonate resin composition highly useful as the raw material for a molded article to which particularly excellent transparency is required can be obtained.

As the silicone compound used as component (C), a silicone compound having a structure in which phenyl group is bonded to the silicon atom in the main chain of the molecule is more preferable since the flame-retardant resin composition comprising the above silicone compound as component (C) retains the excellent properties of the polycarbonate resin. Examples of the above compound include silicone compounds having the polymethylphenylsiloxane structure or the polydiphenyl-siloxane structure in the main chain and at least one reactive group selected from the group consisting of alkoxyl group, hydroxyl group, epoxy group and vinyl group at the end of the molecule or as the side chain.

It is preferable that the silicone compound has a number-average molecular weight of 200 or greater and more preferably in the range of 500 to 5,000,000. The form of the silicone compound may be any of oil, varnish, gum, powder and pellets.

(D) Stabilizer

As the stabilizer of component (D) which is added to the flame-retardant polycarbonate resin composition of the present invention, where desired, at least one compound selected from the group consisting of antioxidants and ultraviolet light absorbents is used.

As the antioxidant, phosphorus-based antioxidants and phenol-based antioxidants are preferable. Examples of the phosphorus-based antioxidant include triphenyl phosphite, diphenyl nonyl phosphite, tris(2,4-di-t-butyl) phosphite, tris-nonylphenyl phosphite, diphenyl isooctyl phosphite, 2,2'-methylenebis(4,6-di-t-butylphenyl) octyl phosphite, diphenyl isodecyl phosphite, diphenyl mono(tridecyl) phosphite, 2,2'-ethylidenebis(4,6-di-t-butylphenol) fluorophosphite, phenyl diisodecyl phosphite, phenyl di(tridecyl) phosphite, tris(2-ethylhexyl) phosphite, tris(isodecyl) phosphite, tris (tridecyl) phosphite, dibutyl hydrogen-phosphite, trilauryl trithiophosphite, tetrakis(2,4-di-t-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-t-butylphenyl) ditridecyl phosphite, bis (2,4-di-t-butylphenyl) pentaerythritol diphosphite, bis(2,6-di-t-butyl-4-methylphenyl) pentaerythritol diphosphite, bis (nonylphenyl) pentaerythritol diphosphite, distearyl pentaerythritol diphosphite, phenyl bisphenol A pentaerythritol diphosphite, tetraphenyldipropylene glycol diphosphite, 1,1,3-tris(2-methyl-4-di-tridecyl phosphite-5-t-butylphenyl)-butane and 3,4,5,6-dibenzo-1,2-oxaphosphan-2-oxide.

Examples of the phenol-based antioxidant include hindered phenols such as n-octadecyl 3-(3',5'-di-t-butyl-4-hydroxyphenyl)propionate, 2,6-di-t-butyl-4-hydroxymethylphenol and 2,2'-methylenebis(4-methyl-6-t-butylphenol) pentaerythrityl tetrakis [3-(3,5-di-t-butyl-4-hydroxyphenyl)-propionate].

Examples of the ultraviolet light absorbent include benzotriazole-based ultraviolet light absorbents such as 2-(2'-hydroxy-5'-methylphenyl)-benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)-benzotriazole, 2-(2'-hydroxy-3',5'-diamylphenyl)benzotriazole, 2-(2'-hydroxy-3'-dodecyl-5'-methylphenyl)benzotriazole, 2-(2'-hydroxy-3',5'-dicumylphenyl)benzotriazole and 2,2'-methylenebis[4-(1,1, 3,3-tetramethylbutyl)-6-(2H-benzotriazol-2-yl)phenol]; salicylate-based ultraviolet light absorbents such as phenyl salicylate, p-t-butylphenyl salicylate and p-octylphenyl salicylate; benzophenone-based ultraviolet light absorbents and triazine-based ultraviolet light absorbents.

As the stabilizer of component (D), compounds other than the above antioxidants and ultraviolet light absorbents such as radical scavengers and acid neutralizing agents can be used singly or in combination with the antioxidants and the ultraviolet absorbents.

As for the contents of the components in the flame-retardant polycarbonate resin composition of the present invention, the content of the polycarbonate resin of component (A) is in the range of 90 to 99.9% by mass. Since the composition comprises a relatively great amount of component (A), the excellent properties proper to the polycarbonate resin such as the excellent transparency, impact strength, heat resistance, electric properties and dimensional stability can be retained. The content of the aromatic vinyl resin having an acid salt group of component (B) is in the range of 0.05 to 5% by mass. Even though the composition comprises a relatively small amount of component (B), the practically sufficient flame-retarding property can be obtained and, at the same time, the retention of the antistatic property sufficient for preventing attachment of dusts to the surface of a molded article can be provided when the flame-retardant polycarbonate resin composition is molded into the article.

When the content of component (B) is smaller than 0.05% by mass, the practically sufficient flame-retarding property cannot be obtained. When the content of component (B) exceeds 5% by mass, the transparency and the impact resistance decrease and the retention of the antistatic property is not provided sufficiently. It is preferable that the content of the aromatic vinyl resin having an acid salt of component (B) is in the range of 0.5 to 3% by mass. When the content of component (B) is in this range, the retention of the antistatic property for preventing attachment of dusts to the surface of a molded article can be further improved.

When the content of the silicone compound of component (C) having a reactive group is in the range of 0.05 to 5% by mass, dropping of liquid drops of the melted flame-retardant polycarbonate resin composition can be suppressed. When the content of component (C) is smaller than 0.05% by mass, dropping of liquid drops of the melted flame-retardant polycarbonate resin composition cannot be suppressed sufficiently. When the content of component (C) exceeds 5% by mass, the transparency and the impact resistance decrease.

The flame-retardant polycarbonate resin composition having excellent color tone and weatherability can be obtained by adding at least one stabilizer selected from antioxidants and ultraviolet light absorbents as component (D) to the basic composition comprising components (A) to (C) described above. The content of the stabilizer of component (D) is in the range of 0.0001 to 1 part by mass and preferably in the range of 0.001 to 0.5 parts by mass per 100 parts by mass of the total of components (A) to (C) as the basic components.

As for the process for producing the flame-retardant polycarbonate resin composition of the present invention, components (A) to (C) described above in amounts corresponding to the contents described above and, where necessary, component (D) described above are suitably mixed and melt kneaded. For the mixing and the kneading, the components are preliminarily mixed by a ribbon blender or a drum tumbler and, then, melt kneaded by a conventional apparatus such as Banbury mixer, a single screw extruder, a twin screw extruder, a multi-screw extruder and cokneader. The temperature of the melt kneading can be suitably selected in the range of 240 to 300° C. For molding the composition obtained by the melt kneading into an article, it is preferable that the melt kneaded composition is extruded by an extruder and preferably by an extruder of the vent type into strands and pellets are formed by cutting the formed strands.

Various molded articles can be produced from the pellets of the flame-retardant polycarbonate resin composition thus obtained in accordance with various molding processes such as the injection molding, the injection compression molding, the extrusion molding, the blow molding and the press molding.

Since the molded article of the present invention obtained as described above exhibits the excellent flame-retarding property and retains the antistatic property to prevent attachment of dusts, the molded article can be advantageously used for applications to which these properties are required and applications to which transparency is required. Examples of the application to which the above properties are required include electric and electronic members such as housings and members of copiers, facsimile apparatuses, televisions, radios, tape recorders, video decks, personal computers, printers, telephones, information terminals, refrigerators and electronic ranges. Examples of the applications to which transparency is required include automobile members such as lenses of head lamps and members of lighting apparatuses.

The present invention will be described more specifically with reference to examples in the following. However, the present invention is not limited to the examples.

EXAMPLES 1 TO 8

[1] Preparation of a Flame-retardant Polycarbonate Resin Composition

Components (A) to (C) as the raw materials and component (D) as the additive were used in amounts shown in Table 1 [the amounts of components (A) to (C) as % by mass and the amount of component (D) as the part by mass per 100 parts by mass of the total of components (A) to (C)]. The components were supplied to a twin screw extruder of the vent type (manufactured by TOSHOBA KIKAI Co., Ltd.; TEM35) and melt kneaded at 280° C. After the resultant composition was extruded to form strands, the formed strands were cut and pellets of the flame-retardant polycarbonate resin composition were obtained.

After the obtained pellets were dried at 120° C. for 12 hours, the pellets were molded in accordance with the injection molding at the molding temperature of 270° C. and a mold temperature of 80° C. and various test pieces were prepared.

As components (A) to (C) of the raw materials and component (D) of the additive, the following substances were used.

(A) Polycarbonate Resin (A-1) A polycarbonate resin having a structural unit derived from 2,2-bis(4-hydroxyphenyl)propane, a linear structure, a viscosity-average molecular weight of 19,000 and a melt flow rate of 19 g/10 minutes as measured in accordance with the method of Japanese Industrial Standard K 7210 under a load of 2160 g at a temperature of 280° C.

(A-2) A polycarbonate resin containing 4% by mass of a block having 30 structural units derived from dimethylsiloxane and the remaining amount of a structural unit derived from 2,2-bis(4-hydroxyphenyl)propane and having a linear structure and a viscosity-average molecular weight of 15,000.

(B) Aromatic Vinyl Resin Having an Acid Salt Group (B-1) Sodium polystyrenesulfonate having a weight-average molecular weight of 20,000 and a fraction of sulfonation of 100%.

(B-2) Potassium polystyrenesulfonate having a weight-average molecular weight of 20,000 and a fraction of sulfonation of 40%.

(B-3) A 30% by mass aqueous solution of potassium polystyrenesulfonate having a weight-average molecular weight of 20,000 and a fraction of sulfonation of 40%.

(C) Silicone Compound Having a Functional Group (C-1) Methylphenylsilicone having a refractive index of 1.51 and vinyl group and methoxyl group as the functional groups [manufactured by SHIN-ETSU CHEMICAL Co., Ltd.; KR219].

(C-2) Methylphenylsilicone having a refractive index of 1.49 and methoxyl group as the functional group [manufactured by TORAY DOW CORNING Co., Ltd.; DC3037].

(D) Stabilizer (D-1) Octadecyl-3-(3,5-di-t-butyl-4-hydroxyphenyl) propionate [manufactured by CIBA SPECIALTY Co., Ltd.; IFGNOX1076].

(D-2) Tris(2,4-di-t-butylphenyl) phosphite [manufactured by CIBA SPECIALTY Co., Ltd.; IRGAFOS168].

(D-3) 2-(2H-Benzotriazol-2-yl)-4-(1,1,3,3-tetramethylbutyl)phenol [manufactured by CIBA SPECIALTY Co., Ltd.; TINUVIN329].

(D-4) 2-(4,6-Diphenyl-1,3,5-triazin-2-yl)-5-(hexyl)oxyphenol [manufactured by CIBA SPECIALTY Co., Ltd.; TINUVIN1577].

[2] Evaluation of the Flame-retardant Polycarbonate Resin Compositions

Using the test pieces of the flame-retardant polycarbonate resin compositions obtained in [1] described above, the following properties of the compositions were evaluated. The results are shown in Table 1.

(1) Izod Impact Strength

The Izod impact strength was measured in accordance with the method of ASTM D256 at 23° C. using a test piece having a thickness of 3.18 mm.

(2) Yellow Index

The yellow index was measured in accordance with the method of Japanese Industrial Standard K 7102 using a square plate having a size of 80×80 mm and a thickness of 3 mm as the test piece and a tester manufactured by NIPPON DENSHOKU KOGYO Co., Ltd.

(3) Haze

The haze was obtained from the transmittance of parallel light measured in accordance with the method of Japanese Industrial Standard K 7105 using a square plate having a size of 25×25 mm and a thickness of 3.2 mm as the test piece and a tester manufactured by NIPPON DENSHOKU KOGYO Co., Ltd.

(4) Half-life of Charged Voltage

Using a square plate having a size of 25×35 mm and a thickness of 3 mm as the test piece, the test piece was charged with electricity under an applied voltage of 9 kv for 1 minute. The time (second) passed from the time when the application of the voltage was stopped to the time when the electric potential reached a half of the initial electric potential was measured.

(5) Half-life of Charged Voltage After Washing with Water

The test piece used in (4) described above was washed with water at 23° C. for 1 minute and water attached to the test piece was wiped off. The washed test piece was charged with static electricity under an applied voltage of 9 kv for 1 minute. The time (second) passed from the time when the application of the voltage was stopped to the time when the electric potential reached a half of the initial electric potential was measured.

(6) Resistance to Light

On a black panel in a xenon weather meter [manufactured by ATLAS Company; CI65; the output: 6.5 kW], a test piece was exposed to the light at 63° C. for 300 hours. The hue (L, a, b) of the exposed test piece was measured by a color difference meter in accordance with the method of Japanese Industrial Standard K 7103 and the change in the hue (ΔE) was obtained.

(7) Flame-retarding Property

A test piece having a thickness of 1.5 mm was subjected to the vertical burning test in accordance with the method of Underwriters Laboratory Subject 94.

(8) Oxygen Index

The oxygen index was obtained in accordance with the method of Japanese Industrial Standard K 7201.

Comparative Examples 1 to 8

[1] Preparation of a Flame-retardant Polycarbonate Resin Composition

Components (A) to (C) of the raw materials and Components (D) and (E) of the additives were used in amounts shown in Table 2 (the same as those in Examples). The components were supplied to a twin screw extruder of the vent type (manufactured by TOSHOBA KIKAI Co., Ltd.; TEM35) and melt kneaded at 280° C. After the resultant composition was extruded to form strands, the formed strands were cut and pellets of the flame-retardant polycarbonate resin composition were obtained.

After the obtained pellets were dried at 120° C. for 12 hours, the pellets were molded in accordance with the injection molding at the molding temperature of 270° C. and a mold temperature of 80° C. and test pieces and molded articles were prepared.

As components (A) to (C) of the raw materials and components (D) and (E) of the additives, the following substances were used.

(A) Polycarbonate Resin

Polycarbonate resin (A-1) used in the Examples.

(B) Aromatic Vinyl Resin Having an Acid Salt Group

Aromatic vinyl resin having an acid salt group (B-2) used in the Examples and the following metal salts.

(B-4) Potassium perfluorobutanesulfonate [manufactured by DAINIPPON INK KAGAKU KOGYO Co., Ltd.; MEGAFAC F114]

(B-5) Sodium dodecylbenzenesulfonate [manufactured by TAKEMOTO YUSHI Co., Ltd.; ELECUT S412-2]

(C) Silicone Compound Having a Functional Group (C-3) Dimethylsilicone having no functional groups [manufactured by TORAY DOW CORNING Co., Ltd.; SH200]

(E) Other Components (E-1) Polytetrafluoroethylene [manufactured by ASAHI GLASS Co., Ltd.; CD076]

[2] Evaluation of the Flame-retardant Polycarbonate Resin Compositions

Using the test pieces of the flame-retardant polycarbonate resin compositions obtained in [1] described above, the same properties of the compositions as those of the compositions in Examples 1 to 8 were evaluated. The results are shown in Table 2.

TABLE 1

| Example | | 1 | 2 | 3 | 4 | 5 | 6 | 7 | 8 |
|---|---|---|---|---|---|---|---|---|---|
| Composition | | | | | | | | | |
| A | (A-1) | 99.5 | 98.5 | 98.5 | 98.0 | 98.0 | 98.0 | 96.7 | |
|   | (A-2) | | | | | | | | 99.6 |
| B | (B-1) | 0.2 | | | | | | | 0.1 |
|   | (B-2) | | 1.0 | 1.0 | 1.0 | 1.0 | 1.0 | | |
|   | (B-3) | | | | | | | 3.0 | |
| C | (C-1) | 0.3 | 0.5 | 0.5 | 0.5 | 0.5 | | 0.3 | |
|   | (C-2) | | | | | | 0.5 | | 0.3 |
| D | (D-1) | | | 0.1 | 0.1 | 0.1 | 0.1 | 0.1 | 0.1 |
|   | (D-2) | | | 0.1 | 0.1 | 0.1 | 0.1 | 0.1 | 0.1 |
|   | (D-3) | | | | 0.3 | | | | |
|   | (D-4) | | | | | 0.3 | 0.3 | 0.3 | 0.3 |
| Evaluation | | | | | | | | | |
| Izod impact strength (kJ/m$^2$) | | 85 | 80 | 85 | 80 | 85 | 80 | 85 | 85 |
| Yellow index | | 10 | 5 | 2 | 3 | 3 | 5 | 2 | 6 |
| Haze | | 7 | 4 | 2 | 2 | 2 | 5 | 2 | 5 |
| Half-life of charged voltage (sec) | | 300 | 15 | 10 | 10 | 5 | 20 | 10 | 300 |
| Half-life of charged voltage after washing with water (sec) | | 280 | 15 | 10 | 10 | 5 | 20 | 10 | 300 |
| Resistance to light | | 12 | 15 | 10 | 6 | 4 | 4 | 3 | 3 |
| Flame-retarding property (UL 94) | | V-0 | V-0 | V-0 | V-0 | V-0 | V-0 | V-0 | V-0 |
| Flame-retarding property (oxygen index) | | 36 | 35 | 36 | 36 | 36 | 35 | 37 | 38 |

TABLE 2

| Comparative Example | | 1 | 2 | 3 | 4 | 5 | 6 | 7 | 8 |
|---|---|---|---|---|---|---|---|---|---|
| Composition | | | | | | | | | |
| A | (A-1) | 99.0 | 99.5 | 93.5 | 93.0 | 98.5 | 98.5 | 98.5 | 98.5 |
| B | (B-2) | 1.0 | | 6.0 | 1.0 | 1.0 | 1.0 | | |
|   | (B-4) | | | | | | | 1.0 | |
|   | (B-5) | | | | | | | | 1.0 |
| C | (C-1) | | 0.5 | 0.5 | 6.0 | | | 0.5 | 0.5 |
|   | (C-3) | | | | | 0.5 | | | |
| E | (E-1) | | | | | | 0.5 | | |
| D | (D-1) | | | | | | 0.1 | 0.1 | 0.1 |
|   | (D-2) | | | | | | 0.1 | 0.1 | 0.1 |
|   | (D-3) | | | | | | | | |
|   | (D-4) | | | | | | 0.3 | 0.3 | 0.3 |
| Evaluation | | | | | | | | | |
| Izod impact strength (kJ/m$^2$) | | 75 | 85 | 30 | 25 | 75 | 75 | 30 | 10 |

TABLE 2-continued

| Comparative Example | 1 | 2 | 3 | 4 | 5 | 6 | 7 | 8 |
|---|---|---|---|---|---|---|---|---|
| Yellow index | 8 | 2 | 20 | 10 | 12 | 15 | 15 | 20 |
| Haze | 10 | 2 | 25 | 40 | 90 | 90 | 90 | 90 |
| Half-life of charged voltage (sec) | 25 | very long | 5 | 10 | 30 | 30 | very long | 3 |
| Half-life of charged voltage after washing with water (sec) | 25 | very long | 5 | 10 | 30 | 30 | very long | very long |
| Resistance to light | 18 | 6 | 30 | 13 | 4 | 4 | 3 | 20 |
| Flame-retarding property (UL 94) | V-2 | V-2 | V-2 | V-2 | V-2 | V-0 | V-2 | V-2 |
| Flame-retarding property (oxygen index) | 35 | 30 | 31 | 34 | 33 | 35 | 34 | 27 |

INDUSTRIAL APPLICABILITY

In accordance with the present invention, the flame-retardant polycarbonate resin composition which exhibits the excellent flame-retarding property and retention of the antistatic property for a long time to prevent the attachment of dusts and the molded article thereof can be provided.

The invention claimed is:

1. A flame-retardant polycarbonate resin composition, which comprises
   90 to 99.9% by mass of a polycarbonate resin as component (A),
   0.05 to 5% by mass of an aromatic vinyl resin having an acid salt group as component (B), and
   0.05 to 5% by mass of a silicone compound having a reactive group as component (C), wherein
   the refractive index of the silicone compound is in the range of 1.45 to 1.55.

2. A flame-retardant polycarbonate resin composition according to claim 1, wherein the polycarbonate resin of component (A) is a polycarbonate copolymer resin having a structural unit derived from an organosiloxane.

3. A flame-retardant polycarbonate resin composition according to claim 1, wherein the aromatic vinyl resin having an acid salt group of component (B) is a metal salt of a polystyrenesulfonic acid.

4. A flame-retardant polycarbonate resin composition according to claim 1, wherein the silicone compound having a reactive group of component (C) is a silicone compound having a reactive group and phenyl group.

5. A flame-retardant polycarbonate resin composition according to claim 1, which further comprises at least one stabilizer selected from a group consisting of antioxidants and ultraviolet light absorbents as component (D).

6. A molded article prepared by molding a flame-retardant polycarbonate resin composition described in claim 1.

7. A molded article according to claim 6, which is a member of an electric or electronic apparatus, a member of an automobile or a member of a lighting apparatus.

8. A molded article according to claim 6, which is a lens of a head lamp of an automobile.

9. A flame-retardant polycarbonate resin composition according to claim 1, wherein the flame-retardant polycarbonate resin composition has a haze in the range of 7 to 2.

* * * * *